United States Patent
Lee

(10) Patent No.: US 9,172,786 B2
(45) Date of Patent: *Oct. 27, 2015

(54) APPARATUS AND METHOD FOR CONTROLLING FUNCTIONS OF A MOBILE PHONE USING NEAR FIELD COMMUNICATION (NFC) TECHNOLOGY

(71) Applicant: AQ CORPORATION, Suwon-Si, Gyeonggi-Do (KR)

(72) Inventor: Sang Hoon Lee, Suwon (KR)

(73) Assignee: AQ Corporation, Suwon-Si (KR)

( * ) Notice: Subject to any disclaimer, the term of this patent is extended or adjusted under 35 U.S.C. 154(b) by 8 days.

This patent is subject to a terminal disclaimer.

(21) Appl. No.: 14/589,754

(22) Filed: Jan. 5, 2015

(65) Prior Publication Data
US 2015/0126114 A1   May 7, 2015

Related U.S. Application Data

(63) Continuation of application No. 14/251,424, filed on Apr. 11, 2014, now Pat. No. 8,929,815, which is a continuation of application No. 13/140,990, filed as application No. PCT/KR2009/007513 on Dec. 16, 2009, now Pat. No. 8,761,665.

(30) Foreign Application Priority Data

Apr. 1, 2009   (KR) .................. 10-2009-0028035

(51) Int. Cl.
*H04M 1/725*   (2006.01)
*H04W 4/00*   (2009.01)
(Continued)

(52) U.S. Cl.
CPC ........ *H04M 1/7253* (2013.01); *H04M 1/72577* (2013.01); *H04W 4/00* (2013.01);
(Continued)

(58) Field of Classification Search
CPC .................. H04M 1/72577; H04M 2250/04; H04W 48/02; H04W 4/00
See application file for complete search history.

(56) References Cited

U.S. PATENT DOCUMENTS 8,014,721 B2   9/2011   Johnson
2003/0109246 A1   6/2003   Shimizu et al.
(Continued)

FOREIGN PATENT DOCUMENTS

JP   2007-087096 A   4/2007
JP   2009-015662 A   1/2009
(Continued)

OTHER PUBLICATIONS

International Search Report dated Jul. 30, 2010 of PCT/KR2009/007513 which is the parent application—4 pages.
(Continued)

*Primary Examiner* — David Bilodeau
(74) *Attorney, Agent, or Firm* — Knobbe Martens Olson & Bear, LLP

(57) ABSTRACT

Disclosed herein is an apparatus for controlling certain functions of a mobile terminal using Near Field Communication (NFC) technology. The apparatus includes an NFC chip module, a base band chip, and a USIM card. The NFC chip module is electrically connected to the base band chip of a mobile terminal, allows a command data signal to be transmitted to the base band chip or a Universal Subscriber Identity Module (USIM) card of the mobile terminal for the control of certain functions of the mobile terminal.

20 Claims, 8 Drawing Sheets

(51) Int. Cl.
*H04W 8/22* (2009.01)
*H04W 48/02* (2009.01)
*H04W 88/06* (2009.01)

(52) U.S. Cl.
CPC ............... *H04W 4/008* (2013.01); *H04W 8/22* (2013.01); *H04M 2250/04* (2013.01); *H04M 2250/14* (2013.01); *H04M 2250/52* (2013.01); *H04W 48/02* (2013.01); *H04W 88/06* (2013.01)

(56) References Cited

U.S. PATENT DOCUMENTS

| | | |
|---|---|---|
| 2004/0224671 A1 | 11/2004 | Benco et al. |
| 2005/0030384 A1 | 2/2005 | Lee et al. |
| 2006/0160562 A1 | 7/2006 | Davis et al. |
| 2008/0207128 A1 | 8/2008 | Mikko |
| 2009/0023476 A1 | 1/2009 | Saarisalo et al. |
| 2009/0177530 A1 | 7/2009 | King et al. |
| 2009/0247077 A1 | 10/2009 | Sklovsky et al. |
| 2009/0312000 A1 | 12/2009 | Wakefield et al. |
| 2011/0234379 A1 | 9/2011 | Lee |
| 2012/0129450 A1 | 5/2012 | Lee |

FOREIGN PATENT DOCUMENTS

| | | |
|---|---|---|
| JP | 2009-157332 A | 7/2009 |
| JP | 2010-074401 A | 4/2010 |
| KR | 10-2006-0095151 A | 8/2006 |
| KR | 10-2006-0099990 A | 9/2006 |
| KR | 10-2008-0002835 A | 1/2008 |
| KR | 10-0809051 B1 | 3/2008 |
| KR | 10-2010-0006869 A | 1/2010 |
| WO | 2006/111782 A1 | 10/2006 |
| WO | 2007/122439 A1 | 11/2007 |

OTHER PUBLICATIONS

ETSI TS 102 613 V7.3.0 (Sep. 2008) Smart Cards; UICC—Contactless Front-end (CLF) Interface Part 1: Physical and data link layer characteristics (Release 7).

Telenor Near Field Communication Opportunities & Standards by Narada Warakagoda, Senior Research Scientist Oct. 2008.

Japanese Office Action dated Aug. 28, 2014 of corresponding Japanese Patent Application No. 2013-548333—3 pages.

APPARATUS AND METHOD FOR CONTROLLING FUNCTIONS OF A MOBILE PHONE USING NEAR FIELD COMMUNICATION (NFC) TECHNOLOGY

RELATED APPLICATIONS

This application is a continuation of U.S. patent application Ser. No. 14/251,424, filed Apr. 11, 2014, which is a continuation of U.S. patent application Ser. No. 13/140,990, filed Jun. 20, 2011, which is the national stage application under 35 U.S.C. §371 of PCT International Application PCT/KR2009/007513, with an International Filing Date of Dec. 16, 2009, which claims the benefit of Korean Patent Application No. 10-2009-0028035 filed Apr. 1, 2009. The entire contents of all of the listed related applications are incorporated herein by reference.

BACKGROUND

The present disclosure relates to an apparatus and method for controlling certain functions of a mobile terminal using Near Field Communication (NFC) technology. NFC technology has been currently developed by an industrial consortium under the name of an NFC forum (http://www.nfc-forum.org).

NFC technology starts from Radio Frequency Identification (RFID) technology (radio identification), and uses an NFC element having a contactless-type communication interface (for transmitting/receiving data in a contactless manner) and various types of operation modes, that is, reader mode, card emulation mode and device mode. In reader mode, that is, in active mode, such an NFC element operates like a conventional RFID reader in order to access an RFID chip (especially, a chip card or a contactless tag) when writing or reading is performed on the RFID chip. Further, an RF (contactless-type) technology includes a Universal Subscriber Identity Module (USIM) which uses a method similar to an NFC method.

The technology is formed using the exchange of information between an RF reader and a USIM. Since the RF (contactless type) area of the USIM in a mobile terminal directly transmits a result value to the RF reader after processing the command of the RF reader, the contact-type section in which communication with the mobile terminal is actually performed cannot be known. For example, when a reader instructs a USIM to restrict the camera function of a mobile terminal using an RF (contactless type), the RF area of the USIM primarily cannot perform communication with a contact section which transmits/receives at least one command in the mobile terminal even though the RF area of the USIM receives the command, so that a command indicative of the restriction of the camera function cannot be transmitted to the mobile terminal.

The discussions in this section are only to provide background information about the invention and does not constitute an admission of prior art.

SUMMARY

One aspect of the invention provides a mobile terminal comprising: a baseband chip configured to process commands and control a plurality of modes of the mobile terminal; an NFC module comprising an NFC chip and RF antenna, the NFC chip being connected to the baseband chip and the RF antenna; and a USIM card connected to the baseband chip and the NFC module. In the mobile terminal, the NFC module is configured to operate in a plurality of modes comprising a reader mode and a tag (or card emulation) mode, wherein in the reader mode, the NFC module is configured to read data from an external NFC tag, wherein in the tag mode, the NFC module is configured to provide data for another RF reader to read; wherein upon tagging with an external RF device that is programmed with a mode-control command, the NFC module is configured to read data from the external RF device that comprise a mode-control command, to cause the data from the external RF device to be forwarded to the baseband chip such that the baseband chip processes the mode-control command of the data to control at least one of the plurality of modes in accordance with the mode-control command, and to cause to send, to the external RF device, signals indicative of processing of the mode-control command.

In the foregoing mobile terminal, the NFC module may cause the data from the external RF device to be forwarded either directly to the baseband chip or via the USIM to enable at least one function of the USIM in addition to control of the at least one mode of the mobile terminal, wherein the at least one function of the USIM may comprise causing the mobile terminal to be authenticated. The NFC module may be configured to forward the data from the external RF device to the USIM card, and the USIM card may be configured to forward the data to the baseband chip. The USIM card may be configured to forward the data from the external RF device to the baseband chip after authenticating the mobile terminal. The USIM card may be configured to forward the data from the external RF device to the baseband chip only when the mobile terminal is authenticated. The data from the external RF device may be configured to be routed to the USIM card according to a Single Wired Protocol (SWP). The USIM card may comprise a memory that stores an electronic serial number (ESN) of the mobile terminal for use in authentication of the electronic mobile device. The mobile terminal may be configured to use the ESN stored in the memory of the USIM card for authentication even if another ESN of the mobile terminal may be stored within the mobile terminal. The baseband chip may contain another ESN of the mobile terminal, wherein for authentication only the ESN stored in the memory of the USIM may be used for authentication.

Still in the foregoing mobile terminal, the RF antenna may comprise a read antennae and a tag antennae that are stacked together, wherein in the reader mode, the read antennae may be activated while the tag antennae is not. The external RF device may be configured to perform a tag mode and a reader/writer mode, wherein in the reader/writer mode, the RF device may be configured to read data from or write data in the NFC module, wherein in the tag mode, the RF device may be configure to provide data form the NFC module to read. The external RF device may be further configured to send an RF command for authenticating the mobile terminal. The mode-control command may be to activate or deactivate at least one of a silent-ringtone, a manner mode, a camera-function restriction mode, and a communication zone grouping mode. The data from the external RF device further may comprise a release time of the at least one mode. The data from the external RF device further may comprise compulsory release instructions for a user of the mobile terminal to use for deactivate the at least one activated mode prior to the release time.

Another aspect of the invention provides a system comprising: the mobile terminal set forth in the foregoing paragraphs; and the external RF device installed at an entrance or exit of a facility, wherein the external RF device is configured for setting the mode-control command, for sending the data comprising the mode-control command, and for sending an RF command for authenticating the mobile terminal. In the system, external RF device may be configured to perform a tag mode and a reader/writer mode, wherein in the reader/writer mode, the RF device may be configured to read data from or write data in the NFC module, wherein in the tag mode, the RF device may be configure to provide data form the NFC module to read. The USIM card may be configured to forward the data from the external RF device to the baseband chip only when the mobile terminal is authenticated.

Still another aspect of the invention provides a method of controlling operation of a mobile terminal. The method comprises: providing a mobile terminal comprising a baseband chip, an NFC module comprising an NFC chip and RF antenna, and a USIM card connected to the baseband chip and the NFC module, the baseband chip configured to process commands and control a plurality of modes of the mobile terminal, the NFC chip being connected to the baseband chip and the RF antenna, the USIM comprising a unique identification code for authenticating the mobile terminal, wherein the NFC module is configured to operate in a plurality of modes comprising a reader mode and a tag (or card emulation) mode, wherein in the reader mode, the NFC module is configured to read data from an external NFC tag, wherein in the tag mode, the NFC module is configured to provide data for another RF reader to read; establishing an NFC channel between the mobile terminal and an external RF device installed at an entrance or exit of a facility by tagging the external RF device with the mobile terminal, wherein the external RF device is configured to perform a tag mode and a reader/writer mode, wherein the external RF device is further configured to send an RF command for authenticating the mobile terminal; receiving, at the NFC module of the mobile terminal, data from the external RF device, the data comprising a mode-control command; forwarding the data from the external RF device to the USIM; subsequently causing authentication of the mobile terminal; only after authentication, forwarding the data from the external RF device to the baseband chip; processing, at the baseband chip, the mode control command of the data to control at least one of the plurality of modes in accordance with the mode-control command; and causing the NFC module to send, to the external RF device, signals indicative of processing of the mode-control command. In the foregoing method, the mode-control command may be to activate or deactivate at least one of a silent-ringtone, a manner mode, a camera-function restriction mode, and a communication zone grouping mode.

According to an aspect of the present invention, an apparatus for controlling ringtone, camera, and communication functions of a mobile terminal using a Near Field Communication (NFC) chip module and an external Radio Frequency (RF) reader, the apparatus including: an NFC chip module electrically connected to a base band chip provided in a mobile terminal, configured to perform selection such that a command data signal, received from an external RF reader via an RF antenna, is transmitted to the base band chip or a Universal Subscriber Identity Module (USIM) card of the mobile terminal, and configured to receive a result of terminal processing of the base band chip which operates in compliance with the command data signal received from the external RF reader, and configured to transmit a result of the terminal processing to the external RF reader via the RF antenna; the base band chip electrically connected to the NFC chip module, configured to receive the command data signal from the external RF reader, configured to change a main operation mode of the mobile terminal in accordance with a set mode of the external RF reader in compliance with the command data signal received from the external RF reader, and configured to transmit the result of the terminal processing of the mobile terminal, obtained through conversion, to the NFC chip module; and the USIM card electrically connected to the base band chip and the NFC chip module, configured to perform at least one of network authentication, electronic commerce, and a global roaming communication service, and configured, when a communication connection signal of the NFC chip module is received, to receive an RF-related command including an Single Wired Protocol (SWP) and process the RF-related command in compliance with the command data signal received from the external RF reader.

According to an aspect of the present invention, a method for controlling a function of a mobile terminal using a Near Field Communication (NFC) chip module and an external Radio Frequency (RF) reader, the method including: setting a command data signal used to set/release a specific function mode of the mobile terminal in the external RF reader; tagging the mobile terminal in which an NFC chip module is provided with the external RF reader, and transmitting the command data signal received from the external RF reader by the NFC chip module to a base band chip; performing, in the base band chip, conversion of an operation mode of the mobile terminal in response to the command data signal received from the NFC main chip, displaying a result of terminal processing of the mobile terminal on the display of the mobile terminal in the form of information, and transmitting the result to the NFC chip module; and receiving in the NFC chip module the result of the terminal processing of the base band chip which operates in compliance with the command data signal, and transmitting the result of the terminal processing to the external RF reader.

According to an aspect of the present invention, the function is at least one selected from the group consisting of ringtone function, camera function and communication function. According to an aspect of the present invention, the operation mode of the mobile terminal is set as or released from a silent ringtone mode after performing the conversion, a camera function restriction mode after performing the conversion, or a communication zone grouping mode after performing the conversion. According to an aspect of the present invention, the mobile terminal is a mobile phone.

According to an aspect of the present invention, an apparatus for controlling ringtone, camera, and communication functions of a mobile terminal using a Near Field Communication (NFC) chip module and an external Radio Frequency (RF) reader, the apparatus including: an NFC chip module electrically connected to a base band chip provided in a mobile terminal, configured to perform selection such that a command data signal, received from an external RF reader via an RF antenna, is transmitted to the base band chip or a Universal Subscriber Identity Module (USIM) card of the mobile terminal, and configured to receive a result of terminal processing of the base band chip which operates in compliance with the command data signal received from the external RF reader, and configured to transmit a result of the terminal processing to the external RF reader via the RF antenna, the NFC chip module includes: the RF antenna for performing an RF (contactless) reader function or a tag function depending on the contactless-type external RF reader, receiving the command data signal, transmitting the command data signal to a tuning unit, and transmitting a response data signal from an NFC main chip to the external RF reader; a tag circuit unit for amplifying the command data signal tagged and received via the RF antenna, transmitting the amplified command data signal to the NFC main chip, modulating response data transmitted from the NFC main chip, and transmitting the modulated response data to the RF antenna; a receiver circuit unit for filtering and amplifying the command data signal received by the RF (contactless) reader via the RF antenna, demodulating the amplified command data signal into a digital signal, and then transmitting the demodulated command data signal to the NFC main chip; the NFC main chip for performing control such that the command data signal, received from the external RF reader through the tag circuit unit or the receiver circuit unit, is selected to be transmitted to the base band chip or the USIM card, and a terminal processing response data signal of the base band chip which operates in compliance with the command data signal received from the external RF reader is received and then transmitted to the external RF reader via the RF antenna, the NFC main chip connected to the base band chip of the mobile terminal through the UART host interface unit, configured to receive the terminal processing response data signal of the base band chip which operates in compliance with the command data signal received from the external RF reader, configured to connect the receiver circuit unit to a receiver input terminal, configured to receive the command data signal of an external RF terminal which was received through the receiver circuit unit, configured to include an internal reference voltage terminal connected to a power unit of the receiver circuit unit in order to transmit internal reference voltage to the receiver circuit unit, configured to include two transmitter terminals which are connected to the tag circuit unit in order to output 13.56 MHz to the tag circuit unit, configured to perform matching on the external RF terminal in order to receive the command data signal from the external RF terminal, configured to include an interrupt request terminal which is connected to an input terminal of the base band chip of the mobile terminal, configured to transmit an interrupt event signal to the base band chip of the mobile terminal, configured to transmit the command data signal from the external RF terminal, configured to include a NOT reset power down terminal which is connected to an output terminal of the base band chip of the mobile terminal, configured to switch off internal current connection when a low signal is received from the base band chip, configured to stop a drive of an oscillator, and configured to block connection between the external RF reader and the receiver input terminal and connection between the external RF reader and the two transmitter terminals; and a Universal Asynchronous Receiver/Transmitter (UART) host interface unit for transmitting the terminal processing response data signal of the base band chip which operates in compliance with the command data signal received from the external RF reader to the NFC main chip; the base band chip electrically connected to the NFC chip module, configured to receive the command data signal from the external RF reader, configured to change a main operation mode of the mobile terminal in accordance with a set mode of the external RF reader in compliance with the command data signal received from the external RF reader, and configured to transmit the result of the terminal processing of the mobile terminal, obtained through conversion, to the NFC chip module; and the USIM card electrically connected to the base band chip and the NFC chip module, configured to perform at least one of network authentication, electronic commerce, and a global roaming communication service, and configured, when a communication connection signal of the NFC chip module is received, to receive an RF-related command including an Single Wired Protocol (SWP) and process the RF-related command in compliance with the command data signal received from the external RF reader.

According to an aspect of the present invention, the NFC main chip includes a communication interface input terminal and a communication interface output terminal which are connected to the USIM card using SWP, and transmits the command data signal from the external RF reader via the RF antenna, so that the command data signal from the external RF reader is transmitted to the base band chip while network authentication, electronic commerce, and/or a global roaming communication service are performed using the USIM card.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF CERTAIN EMBODIMENTS

Figure 1:
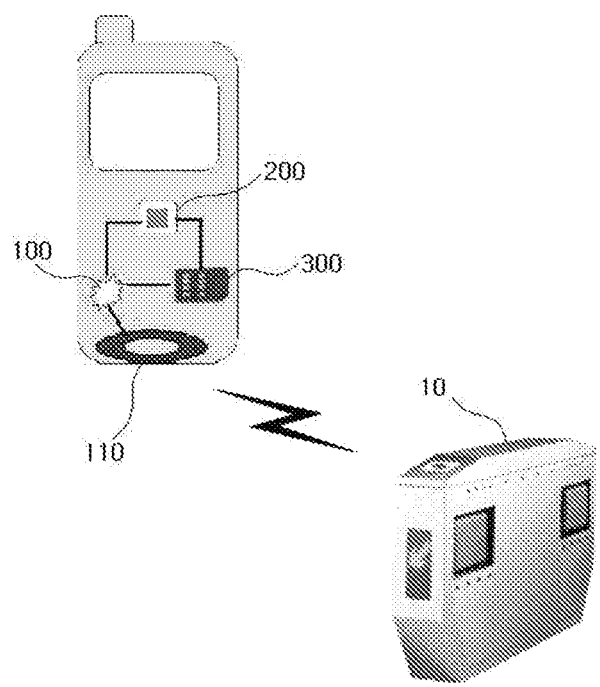
FIG. 1 is a block diagram illustrating the configuration elements of an apparatus for controlling the ringtone, camera, and communication functions of a mobile terminal using an NFC chip module and an external RF reader according to an embodiment of the present invention.

Reference now should be made to the drawings, in which the same reference numerals are used throughout the different drawings to designate the same or similar components.

Embodiments of the present invention will be described with reference to the attached drawings below.

FIG. 1 is a block diagram illustrating the configuration elements of an apparatus for controlling the ringtone, camera, and communication functions of a mobile terminal using an NFC chip module and an external RF reader according to an embodiment of the present invention. The apparatus for controlling the ringtone, camera, and communication functions of a mobile terminal using an NFC chip module and an external RF reader includes an NFC chip module 100, a base band chip 200, and a USIM card 300.

An external RF reader 10 according to an embodiment of the present invention is a configuration which is installed at a place such as an entrance/exit of a performance hall, a school, or a security facility, and which, when the external RF reader 10 is connected to a mobile terminal in which the NFC chip module is provided in contact-type or RF (contactless-type) manner, transmits a command indicative of setting/releasing the function of a mobile terminal as/from silent ringtone/etiquette mode, a command indicative of setting/releasing the function of the mobile terminal as/from camera function restriction mode, or a command indicative of setting/releasing the function of the mobile terminal as/from communication zone grouping mode. The external RF reader is formed of any one selected from among an International Organization for Standardization (ISO) 14443A, a B reader, a Mifare reader and a Felica reader, and includes a 13.56 Mhz RF antenna corresponding to that of the mobile terminal, and a command transmission unit for transmitting a command data signal to the mobile terminal inside.

Further, the external RF reader includes a reception unit for receiving the results of the terminal processing of the base band chip of the mobile terminal via an RF antenna, the base band chip operating in compliance with an external command. Further, when the command transmission unit transmits the command data signal to the mobile terminal, the external RF reader 10 according to an embodiment of the present invention is configured to transmit a release time and compulsory release data, used to change the setting when a user wants compulsory release before the release time elapses, to the mobile terminal, together with the command data signal.

First, an NFC chip module 100 according to an embodiment of the present invention will be described. The NFC chip module 100 is a configuration which is electrically connected to a base band chip provided in the mobile terminal, performs selection such that the command data signal from the external RF reader via an RF antenna is transmitted to the base band chip or a USIM card, receives the results of the terminal processing of the base band chip which operates in compliance with the external command, and transmits the results of the terminal processing of the base band chip to the external RF reader via the RF antenna. The NFC chip module 100 includes an RF antenna 110, a tuning unit 115, a tag circuit unit 120, a receiver circuit unit 130, an NFC main chip 140, and a Universal Asynchronous Receiver/Transmitter (UART) host interface unit 150.

The RF antenna 110 performs a function as an RF (contactless) reader or a tag depending on the contactless-type external RF reader, receives the command data signal, transmits the command data signal to the tuning unit, and transmits a response data signal from an NFC main chip to the external RF reader. The RF antenna 110 is formed of an integrated-type dual antenna structure in which an initiator (reader) antenna and a tag (target) antenna are integrated in a stacked structure. The dual antenna includes first and fourth wiring layers configured to form a ground blocking layer and the tag antenna, and second and third wiring layers configured to form the initiator (reader) antennas in a Printed Circuit Board (PCB) having a four-layer wiring.

Figure 3:
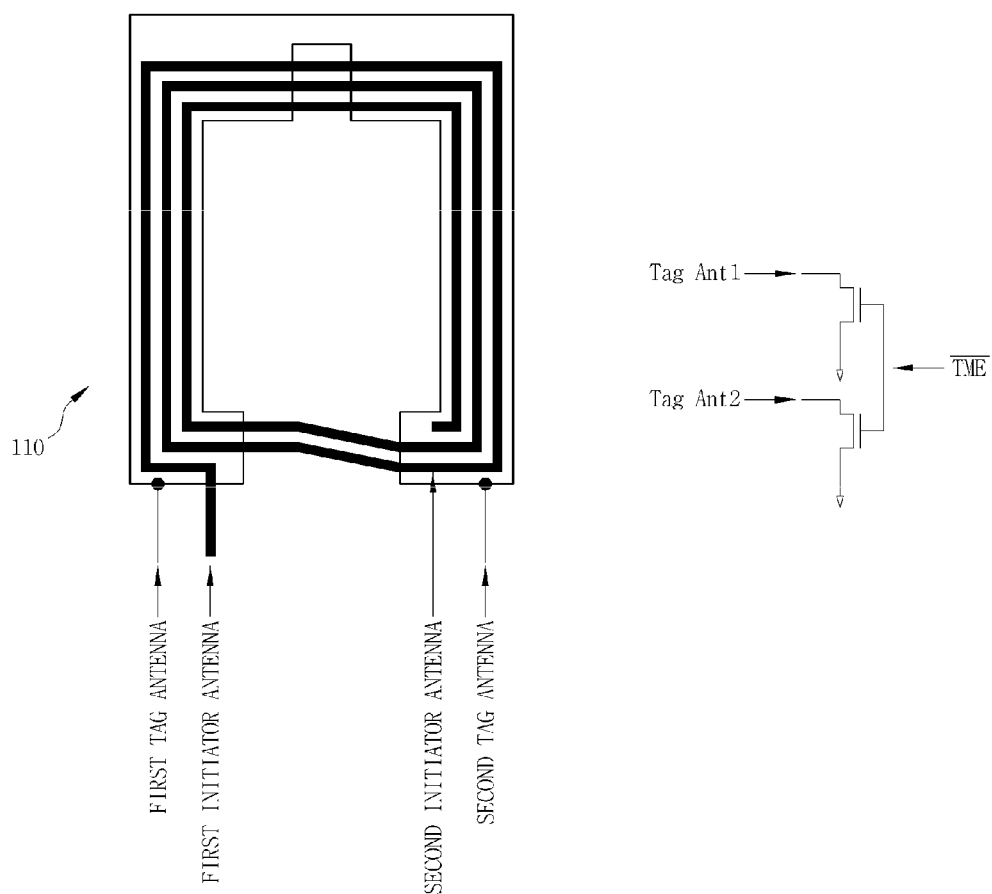
FIG. 3 is a view illustrating the configuration of an RF antenna according to an embodiment of the present invention.

When the RF antenna according to an embodiment of the present invention operates in reader mode, the ground blocking layer is connected to the ground and the tag antenna is used as the ground blocking film of the initiator antenna. When the RF antenna operates in tag mode, a ground wire connection switch TME is provided, as shown in FIG. 3, and the RF antenna is used as a 13.56 MHz tag antenna. That is, the tag antenna of the RF antenna according to an embodiment of the present invention operates in such a way that, when the initiator antenna is not used, the ground wire connection switch TME is turned off and an external RF signal of 13.56 MHz is detected. Here, when the RF signal is detected, the tag antenna determines whether to supply power necessary for the tag circuit unit based on whether external power has been supplied or not.

Figure 2:
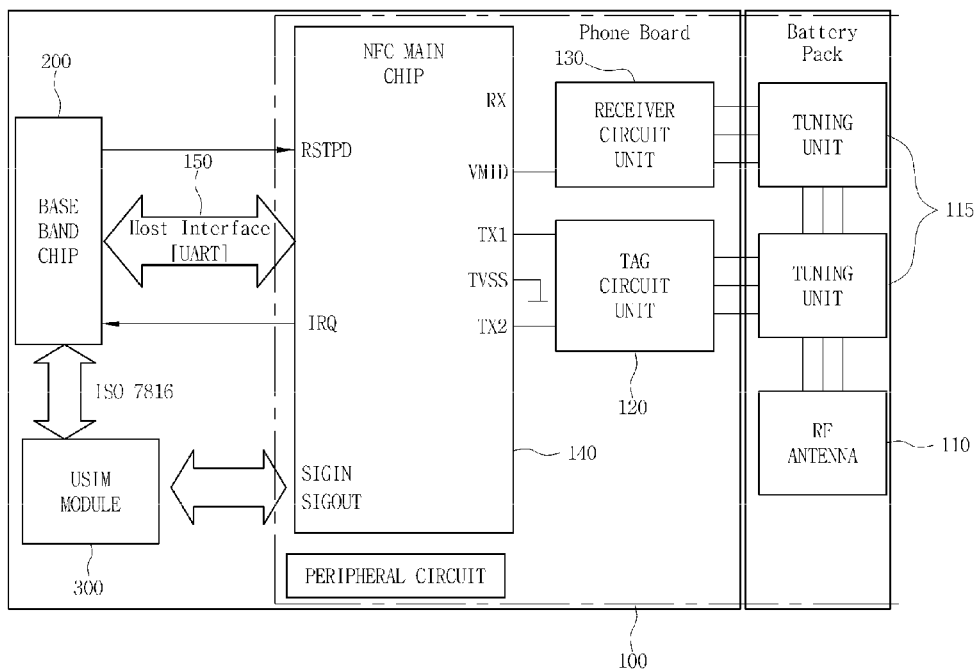
FIG. 2 is a block diagram illustrating the configuration elements of the NFC chip module according to an embodiment of the present invention.

Further, the operation of the RF antenna according to an embodiment of the present invention in reader mode or tag mode depends on the operation mode of the contactless-type external RF reader, and the RF antenna receives the command data signal transmitted to the external RF reader. The RF antenna 110 according to an embodiment of the present invention includes the tuning unit 115 on one side in order to tune the received command data signal. The tuning unit 115 smoothes the command data signal, received over a band of 13.56 MHz, using a capacitor, and transmits the resulting signal to the receiver circuit unit 130 and the tag circuit unit 120 which are included in the mobile terminal. The antenna 110 and the tuning unit 115 according to an embodiment of the present invention are provided in the battery case of the mobile terminal, as shown in FIG. 2.

Figure 4:
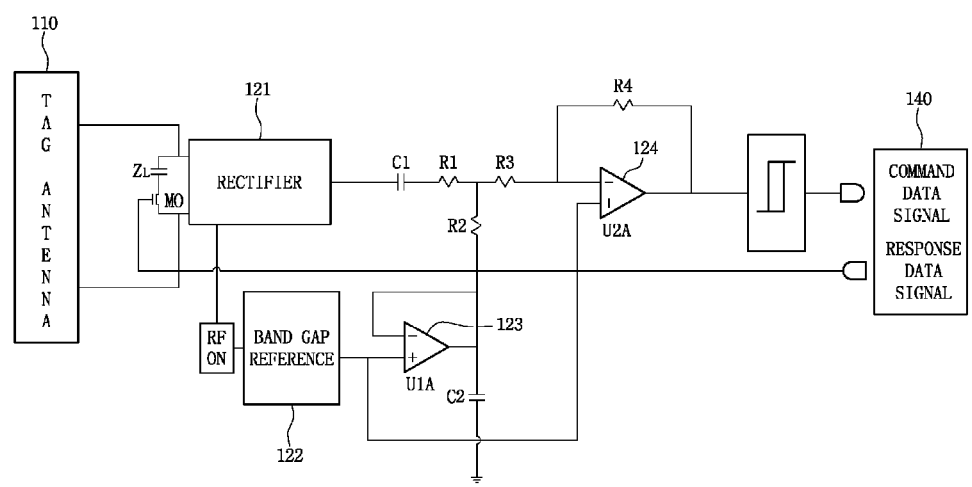
FIG. 4 is a circuit diagram illustrating a tag circuit unit which is the element of the NFC chip module according to an embodiment of the present invention.

The tag circuit unit 120 performs functions of amplifying the command data signal, received via the RF antenna through tagging, transmitting the amplified command data signal to the NFC main chip, modulating response data from the NFC main chip, and transmitting the modulated response data to the RF antenna. The tag circuit unit 120 is connected to the TX1 terminal, TX2 terminal, and SIGIN terminal of an NFC main chip terminal. Further, the tag circuit unit 120 according to an embodiment of the present invention includes a rectifier 121, a capacitor C1, a band gap reference voltage circuit 122, a first amplifier (Operational Amplifier (OP amp)) 123, and a second comparator (OP amp) 124, as shown in FIG. 4. Further, when the tag antenna of the RF antenna is driven and power flows from an external power supply, the circuit of each unit operates using the power generated by the rectifier 121 of the tag circuit unit.

The reception operation of the tag circuit unit 120 according to an embodiment of the present invention is performed in such a way that the rectifier 121 functions as an envelope detector in order to remove the carrier waves of the command data signal received through the tag antenna, the capacitor C1 blocks Direct Current (DC), the band-gap reference voltage circuit 122 adjusts the level of DC, and the adjusted DC is transmitted to the (+) terminal of the first comparator (OP amp) 123.

Here, the first comparator (OP amp) 123 amplifies the command data signal, and the second comparator (OP amp) 124 demodulates the amplified command data signal into a discrete signal and then transmits the discrete signal to the NFC main chip 140. In contrast, the transmission operation of the tag circuit unit 120 is performed in such a way as to receive the response data signal of the base band chip from the NFC main chip 140, switches on an MO, modulates the impedance of ZL, that is, perform load modulation, and then transmits the response data signal to the RF antenna.

Figure 5:
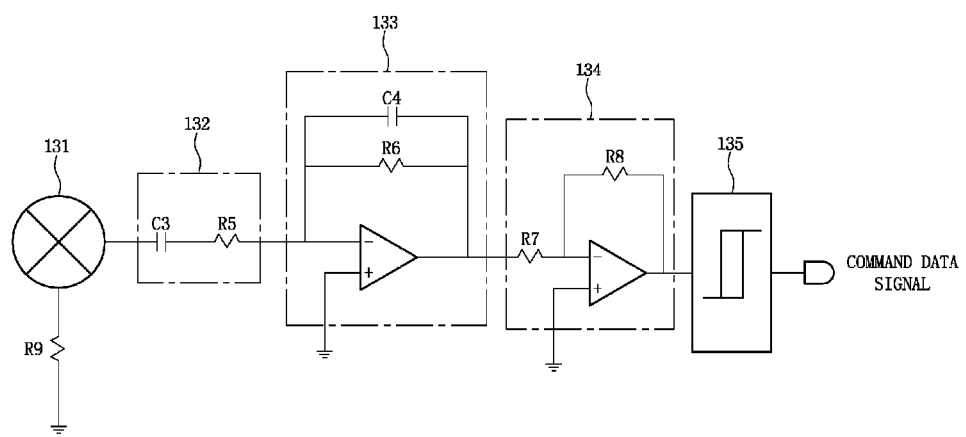
FIG. 5 is a circuit diagram illustrating a receiver circuit unit which is the configuration element of the NFC chip module according to an embodiment of the present invention.

The receiver circuit unit 130 passes and amplifies the command data signal which is read and received in an RF (contactless) manner via the RF antenna, demodulates the amplified command data signal into a digital signal, and then transmits the demodulated command data signal to the NFC main chip. The receiver circuit unit 130 is connected to the RX terminal and VMID terminal of the NFC main chip terminal. The receiver circuit unit 130 according to an embodiment of the present invention performs mixing on the command data signal using a mixer unit 131, passes the resulting command data signal through a high pass filter 132, including a capacitor C3 and a register R5, and a low pass filter 133, including a register R6 and a capacitor C4, amplifies the resulting command data signal using an OP amp 134 including registers R7 and R8, and then inputs the amplified command data signal to the RX terminal of the NFC main chip through a Schmitt trigger 135, as shown in FIG. 5.

The NFC main chip 140 is a configuration which performs control such that the command data signal, received from the external RF reader through the tag circuit unit or the receiver circuit unit, is transmitted to the base band chip or the USIM card, receives the terminal processing response data signal of the base band chip which operates in compliance with the external command, and transmits the terminal processing response data signal to the external RF reader via the RF antenna. The NFC main chip 140 includes an NFC chip which is a transceiver Integrated Chip (IC).

The NFC main chip according to an embodiment of the present invention is used to perform contactless communication over a band of 13.56 Mhz, and includes three modes, that is, a tag mode driven in such a way that any one of an ISO 14443A, a B reader, a Mifare reader, and a Felica reader, which are external RF readers, is installed and connected with the tag circuit unit, a writer/reader mode driven in such a way that any one of the ISO 14443A, the B reader, the Mifare reader, and the Felica reader, which are external RF readers, is installed and connected with the receiver circuit unit, and a Near Field Communication Interface and Protocol (NFCIP)-1 mode (the NFC main chip is independently driven).

FIG. 2 illustrates the structure of the NFC main chip according to an embodiment of the present invention. The NFC main chip is connected to the base band chip of the mobile terminal through an UART host interface unit, receives the terminal processing response data signal of the base band chip which operates in compliance with the external command, connects the receiver circuit unit to a receiver input terminal RX, and receives the command data signal of an external RF terminal, which was received through the receiver circuit unit.

Further, the NFC main chip includes an internal reference voltage terminal VMID which is connected to the power unit of the receiver circuit unit, thereby providing internal reference voltage to the receiver circuit unit, includes two transmitter terminals TX1 and TX2 which are connected to the tag circuit unit, thereby performing output to the tag circuit unit at 13.56 Mhz, and performs matching on the external RF terminal, thereby receiving the command data signal from the external RF terminal.

Further, the NFC main chip includes an interrupt request IRQ connected to the input terminal of the base band chip of the mobile terminal, thereby transmitting an interrupt event signal to the base band chip of the mobile terminal and transmitting the command data signal from the external RF terminal. The NFC main chip includes a NOT reset/power down terminal NRSTPD connected to the output terminal of the base band chip of the mobile terminal. When a low signal is received from the base band chip, internal current connection is switched off, and the driving of an oscillator stops, thereby blocking the connection between the external RF reader and the receiver input terminal RX and the connection between the external RF reader and the two transmitter terminals TX1 and TX2.

The NFC main chip according to an embodiment of the present invention includes a communication interface input terminal SIGNIN and a communication interface output terminal SIGNOUT which are connected to the USIM card using a Single Wired Protocol (SWP), and transmits the command data signal received from the external RF reader via the RF antenna to the USIM card, so that the command data signal from the external RF reader is transmitted to the base band chip while network authentication, electronic commerce, and/or a global roaming communication service are performed using the USIM card.

Next, the base band chip 200 will be described. The base band chip 200 according to an embodiment of the present invention is a configuration which is electrically connected to the NFC chip module, receives the command data signal from the external RF reader, changes the main operation mode of the mobile terminal in accordance with the set mode of the external RF reader in compliance with the external command, and transmits the results of the terminal processing of the mobile terminal to the NFC chip module. The base band chip is formed of the base band chip of the mobile terminal and controls the overall command processing of the mobile terminal and its own hardware function.

The base band chip 120 includes an input terminal to which the interrupt request terminal IRQ of the NFC main chip is connected, receives the command data signal from the external RF terminal using the interrupt event signal of the NFC main chip, and transmits the terminal processing response data signal of the base band chip, which operates based on the external command through the UART host interface unit of the NFC main chip, to the NFC main chip. Further, the base band chip 120 includes another input terminal to which the USIM card is connected, and receives the command data signal from the external RF reader after a network has been authenticated.

Next, the USIM card 300 will be described. The USIM card 300 according to an embodiment of the present invention is a configuration which is electrically connected to the base band chip and the NFC chip module, receives an RF-related command including the SWP, and processes the RF-related command in compliance with the external command when the communication connection signal of the NFC chip module is received while performing network authentication, electronic commerce, and/or global roaming communication service. The USIM card 300 includes an input terminal to which the communication interface input terminal SIGNIN and communication interface output terminal SIGNOUT of the NFC main chip are connected, thereby receiving the RF-related command including the SWP. The USIM card 300 includes an output terminal to which the input terminal of the base band chip is connected, thereby transmitting the command data of the external RF reader, in which network authentication has been completed, to the base band chip.

When the control signal of the NFC chip module is received, the USIM card according to an embodiment of the present invention enables the connection of SWP communication using an NFC communication unit in response to the control signal. Further, the USIM card includes memory for storing the unique number of the mobile terminal (Electronic Serial Number (ESN)), and ESN deactivation means for deactivating ESN stored in the base band chip (Qualcomm chip) of the mobile terminal such that the ESN stored in the memory can be used to authenticate mobile communication service. The memory has a space of 64 KB or more, which is preliminarily prepared in the USIM card, and stores the unique number of the mobile terminal (ESN).

In order to prevent the collision between the ESN stored in the mobile communication base band chip (Qualcomm chip) of the mobile terminal and the ESN stored in the USIM card, the ESN deactivation means deactivates the ESN stored in the base band chip of the mobile terminal when the USIM card is inserted into the mobile terminal so that only the ESN stored in the USIM card can be used to authenticate service. Further, the USIM card 300 converts an RF command into a connection command, or transmits the connection command to the base band chip of the mobile terminal.

Figure 10:
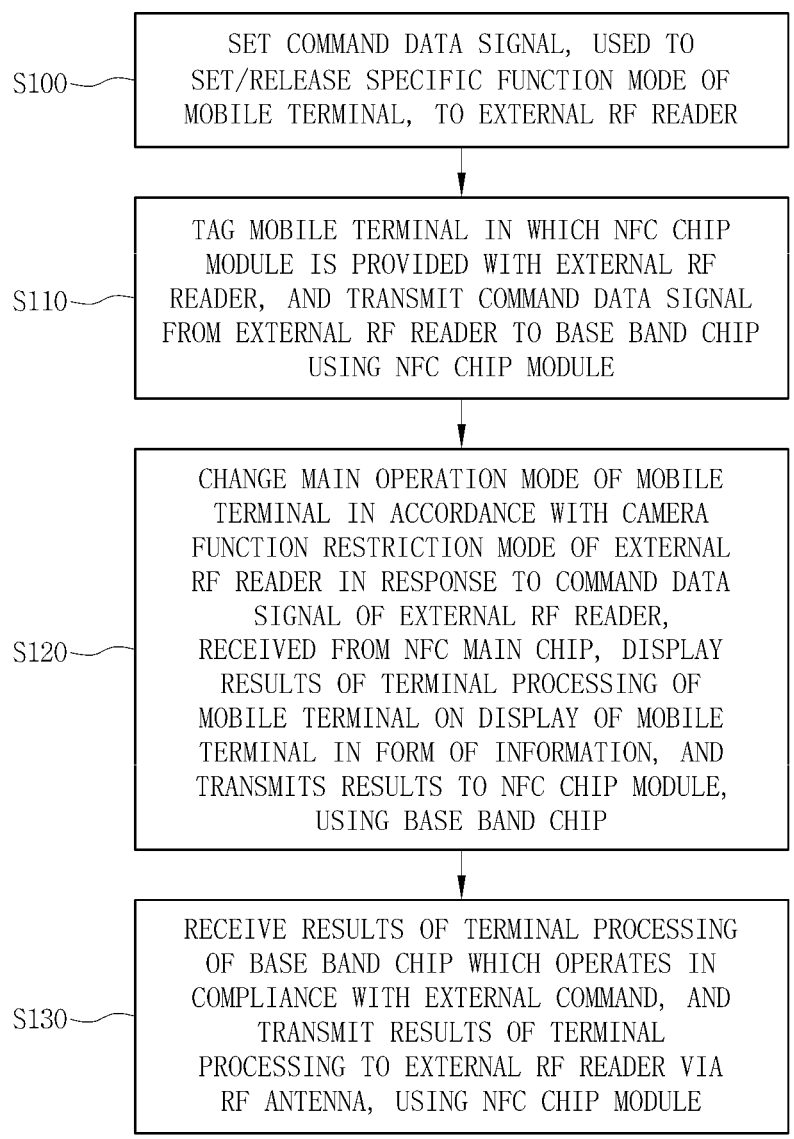
FIG. 10 is a flowchart illustrating the method for controlling the ringtone, camera, and communication functions of a mobile terminal using an NFC chip module and an external RF reader according to an embodiment of the present invention.

A method for controlling the ringtone, camera, and communication functions of a mobile terminal using an NFC chip module and an external RF reader according to an embodiment of the present invention will be described below. FIG. 10 is a flowchart illustrating the method for controlling the ringtone, camera, and communication functions of a mobile terminal using an NFC chip module and an external RF reader according to an embodiment of the present invention.

First, a command data signal, used to set/release the specific function mode of a mobile terminal, is set up in an external RF reader (S100). Thereafter, the mobile terminal in which an NFC chip module is provided is tagged with the external RF reader, and the NFC chip module transmits the command data signal from the external RF reader to a base band chip (S110). Thereafter, the base band chip performs conversion on the main operation mode of the mobile terminal along the camera function restriction mode of the external RF reader in response to the command data signal of the external RF reader, received from the NFC main chip, displays the results of the terminal processing of the mobile terminal on the display of the mobile terminal in the form of information, and transmits the results to the NFC chip module (S120). Thereafter, the NFC chip module receives the results of the terminal processing of the base band chip which operates in compliance with an external command, and transmits the results of the terminal processing to the external RF reader via the RF antenna (S130).

Procedures for setting/releasing the function of mobile terminal as/from a silent ringtone/etiquette mode, a camera function restriction mode, a and communication zone grouping mode using the method for controlling the ringtone, camera, and communication functions of a mobile terminal using an NFC chip module and an external RF reader according to an embodiment of the present invention will be described in detail.

Setting/Releasing as/from Silent Ringtone/Etiquette Mode

Figure 6:
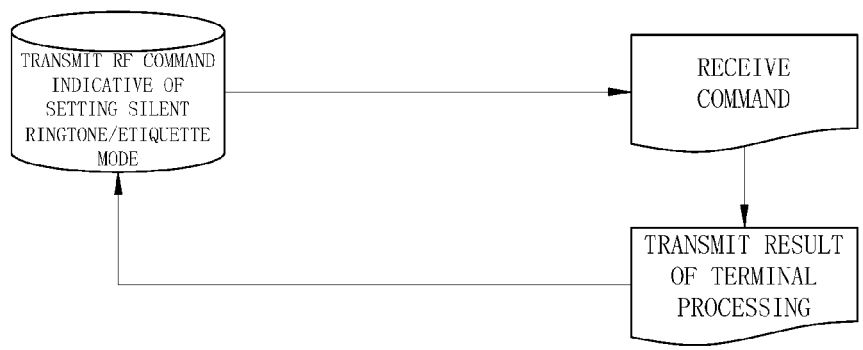
FIG. 6 is a view illustrating a process of setting the function of a mobile terminal to silent ringtone/etiquette mode using a method for controlling the ringtone, camera, and communication functions of a mobile terminal using an NFC chip module and an external RF reader according to an embodiment of the present invention.
Figure 7:
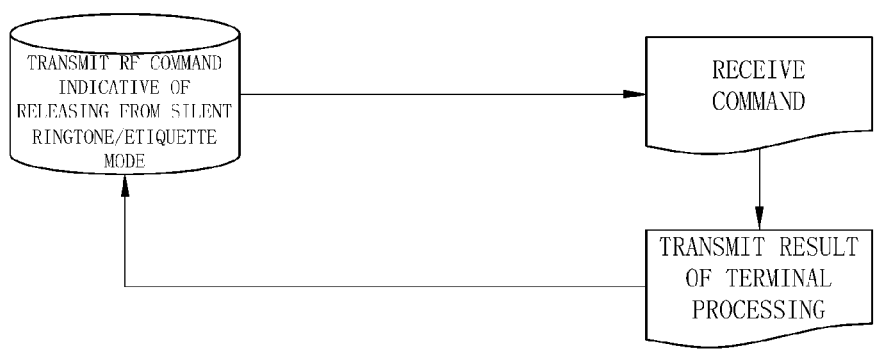
FIG. 7 is a view illustrating a process of releasing the function of the mobile terminal from the silent ringtone/etiquette mode using the method for controlling the ringtone, camera, and communication functions of a mobile terminal using an NFC chip module and an external RF reader according to an embodiment of the present invention.

Setting/releasing as/from silent ringtone/etiquette mode according to an embodiment of the present invention is used to set/release a mobile terminal so that the ringtone of the mobile terminal does not ring when the mobile terminal is tagged with an external RF reader installed at an entrance/exit to a place such as a conference room or a performance hall that is entered, as shown in FIGS. 6 and 7.

Procedure of Setting as Silent Ringtone/Etiquette Mode

First, a command data signal, used to set silent ringtone/etiquette mode, is set up in the external RF reader. Thereafter, a mobile terminal, in which an NFC chip module is provided, is tagged with the external RF reader. Here, when the external RF reader transmits the command data signal to the mobile terminal, the external RF reader transmits a release time and compulsory release data, which can be used to change the setting when a user wants compulsory release before the release time elapses, to the mobile terminal.

Thereafter, the NFC chip module transmits the command data signal, received from the external RF reader via an RF antenna, to a base band chip. That is, the RF antenna of the NFC chip module performs a tagging function based on the contactless-type external RF reader, receives the command data signal, and transmits the command data signal to a tag circuit unit via a tuning unit.

Thereafter, the tag circuit unit amplifies the command data signal tagged and received via the RF antenna, and transmits the amplified command data signal to the NFC main chip. The NFC main chip transmits an interrupt event signal to the base band chip of the mobile terminal through using the interrupt request terminal IRQ, and transmits the command data signal from the external RF terminal.

Here, the base band chip transmits a low signal to the NOT rest/power down terminal NRSTPD of the NFC main chip, switches off internal current connection, stops the drive of an oscillator, and blocks connection between the external RF reader and a receiver input terminal RX and the connection between the external RF reader and two transmitter terminals TX1 and TX2.

Thereafter, the base band chip performs conversion on the main operation mode of the mobile terminal along the silent ringtone/etiquette mode of the external RF reader in response to the command data signal of the external RF reader, received from the NFC main chip, displays the results of the terminal processing of the mobile terminal on the display of the mobile terminal in the form of information, and transmits the results to the NFC chip module.

Thereafter, the NFC chip module receives the results of terminal processing (silent ringtone/etiquette mode) of the base band chip which operates in compliance with the external command, and transmits the results of the terminal processing to the external RF reader via the RF antenna.

Procedure of Releasing from Silent Ringtone/Etiquette Mode

First, a command data signal, used to release from the silent ringtone/etiquette mode, is set up in the external RF reader. Thereafter, the mobile terminal, in which an NFC chip module is provided, according to an embodiment of the present invention is tagged with the external RF reader.

Thereafter, the NFC chip module transmits the command data signal, received from the external RF reader via the RF antenna, to the base band chip. That is, the RF antenna of the NFC chip module performs a tagging function based on the contactless-type external RF reader, receives the command data signal, and transmits the command data signal to the tag circuit unit via the tuning unit.

Thereafter, the tag circuit unit amplifies the command data signal tagged and received via the RF antenna, and transmits the amplified command data signal to the NFC main chip. The NFC main chip transmits an interrupt event signal to the base band chip of the mobile terminal through the interrupt request terminal IRQ, and transmits the command data signal from the external RF terminal.

Here, the base band chip transmits a low signal to the NOT rest/power down terminal NRSTPD of the NFC main chip, switches off the internal current connection, stops the drive of the oscillator, and blocks connection between the external RF reader and the receiver input terminal RX and the connection between the external RF reader and the two transmitter terminals TX1 and TX2.

Thereafter, the base band chip releases the silent ringtone/etiquette mode of the mobile terminal in response to the command data signal of the external RF reader, which was received from the NFC main chip, converts the ringtone/ etiquette mode into the main operation mode of the mobile terminal, displays the results of the terminal processing of the mobile terminal, obtained through conversion, on the display of the mobile terminal in the form of information, and transmits the results to the NFC chip module.

Thereafter, the NFC chip module receives the results of the terminal processing (release of silent ringtone/etiquette mode) of the base band chip which operates in compliance with an external command, and transmits the results of the terminal processing to the external RF reader via the RF antenna.

Setting/Releasing as/from Camera Function Restriction Mode

Figure 8:
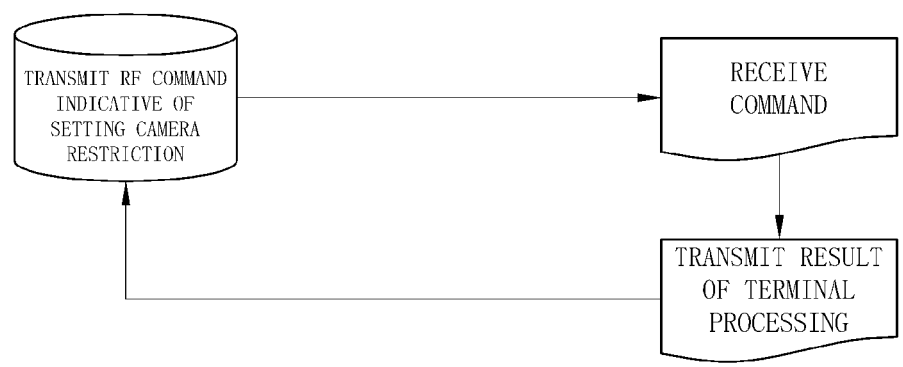
FIG. 8 is a view illustrating a process of setting the function of the mobile terminal to camera function restriction mode using the method for controlling the ringtone, camera, and communication functions of a mobile terminal using an NFC chip module and an external RF reader according to an embodiment of the present invention.
Figure 9:
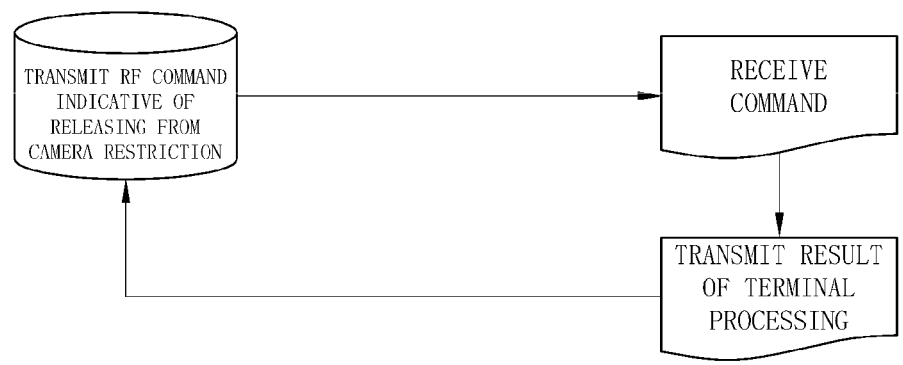
FIG. 9 is a view illustrating a process of releasing the function of the mobile terminal from camera function restriction mode using the method for controlling the ringtone, camera, and communication functions of a mobile terminal using an NFC chip module and an external RF reader according to an embodiment of the present invention.

Setting/releasing as/from camera function restriction mode according to an embodiment of the present invention is used to set such that the camera function of a mobile terminal stops when the mobile terminal is tagged with an external RF reader installed at an entrance to a place such as a company or a laboratory which requires security, and then used to restore the original camera function of the mobile terminal when the mobile terminal is tagged with an external RF reader installed at an exit at the time of going home after business ends, as shown in FIGS. 8 and 9.

Procedure of Setting Camera Function Restriction Mode

First, a command data signal, used to set camera function restriction mode, is set up in the external RF reader. Thereafter, a mobile terminal, in which an NFC chip module is provided, is tagged with the external RF reader. Here, when the external RF reader transmits the command data signal to the mobile terminal, the external RF reader transmits a release time and compulsory release data, which can be used to change the setting when a user wants compulsory release before the release time elapses, to the mobile terminal.

Thereafter, the NFC chip module transmits the command data signal, received from the external RF reader via an RF antenna, to a base band chip. That is, the RF antenna of the NFC chip module performs a tagging function based on the contactless-type external RF reader, receives the command data signal, and transmits the command data signal to a tag circuit unit via a tuning unit.

Thereafter, the tag circuit unit amplifies the command data signal tagged and received via the RF antenna, and transmits the amplified command data signal to the NFC main chip. The NFC main chip transmits an interrupt event signal to the base band chip of the mobile terminal through using the interrupt request terminal IRQ, and transmits the command data signal from the external RF terminal.

Here, the base band chip transmits a low signal to the NOT rest/power down terminal NRSTPD of the NFC main chip, switches off internal current connection, stops the drive of an oscillator, and blocks connection between the external RF reader and a receiver input terminal RX and the connection between the external RF reader and two transmitter terminals TX1 and TX2.

Thereafter, the base band chip changes the main operation mode of the mobile terminal in accordance with the camera function restriction mode of the external RF reader in response to the command data signal of the external RF reader, received from the NFC main chip, displays the results of the terminal processing of the mobile terminal on the display of the mobile terminal in the form of information, and transmits the results to the NFC chip module.

Further, if the results are transmitted to the USIM card which supports the SWP based on a design structure, the USIM card, which supports the SWP, performs the corresponding function of the NFC main chip, displays processed information on the display of the mobile terminal, and then transmits processed results to the NFC chip module.

Thereafter, the NFC chip module receives the results of terminal processing (camera function restriction mode) of the base band chip which operates in compliance with the external command, and transmits the results of the terminal processing to the external RF reader via the RF antenna.

Procedure of Releasing from Camera Function Restriction Mode

First, a command data signal, used to release from the camera function restriction mode, is set up in the external RF reader. Thereafter, the mobile terminal, in which an NFC chip module is provided, according to an embodiment of the present invention is tagged with the external RF reader. Here, when the external RF reader transmits the command data signal to the mobile terminal, the external RF reader transmits a release time and compulsory release data, which can be used to change the setting when a user wants compulsory release before the release time elapses, to the mobile terminal.

Thereafter, the NFC chip module transmits the command data signal, received from the external RF reader via the RF antenna, to the base band chip. That is, the RF antenna of the NFC chip module performs a tagging function based on the contactless-type external RF reader, receives the command data signal, and transmits the command data signal to the tag circuit unit via the tuning unit.

Thereafter, the tag circuit unit amplifies the command data signal tagged and received via the RF antenna, and transmits the amplified command data signal to the NFC main chip. The NFC main chip transmits an interrupt event signal to the base band chip of the mobile terminal through the interrupt request terminal IRQ, and transmits the command data signal from the external RF terminal.

Here, the base band chip transmits a low signal to the NOT rest/power down terminal NRSTPD of the NFC main chip, switches off the internal current connection, stops the drive of the oscillator, and blocks connection between the external RF reader and the receiver input terminal RX and the connection between the external RF reader and the two transmitter terminals TX1 and TX2.

Thereafter, the base band chip releases the camera function restriction mode of the mobile terminal in response to the command data signal of the external RF reader, which was received from the NFC main chip, converts the camera function restriction mode into the main operation mode of the mobile terminal, displays the results of the terminal processing of the mobile terminal, obtained through conversion, on the display of the mobile terminal in the form of information, and transmits the results to the NFC chip module.

Further, if the results are transmitted to the USIM card which supports the SWP based on a design structure, the USIM card, which supports the SWP, performs the corresponding function of the NFC main chip, displays processed information on the display of the mobile terminal, and then transmits processed results to the NFC chip module.

Thereafter, the NFC chip module receives the results of the terminal processing (release of the camera function restriction mode) of the base band chip which operates in compliance with an external command, and transmits the results of the terminal processing to the external RF reader via the RF antenna.

Setting/Releasing as/from Communication Zone Grouping Mode

Setting/releasing as/from communication zone grouping mode is used, when an external RF reader is installed at the entrance to a specific place, such as Starbucks, and a mobile terminal is tagged with the external RF reader, to connect the mobile terminal of a user with another mobile terminal in the Starbucks, make them in a group, provide wireless Internet service and chatting service, thereby forming a Peer to Peer (P2P) communication zone, and used, when the mobile terminal is carried outside of the Starbucks and tagged with an external RF reader installed at an exit, to restore the original communication function of the mobile terminal.

Procedure of Setting Communication Zone Grouping Mode

First, a command data signal, used to set communication zone grouping mode, is set up in the external RF reader. Thereafter, a mobile terminal, in which an NFC chip module is provided, is tagged with the external RF reader.

Thereafter, the NFC chip module transmits the command data signal, received from the external RF reader via an RF antenna, to a base band chip. That is, the RF antenna of the NFC chip module performs a tagging function based on the contactless-type external RF reader, receives the command data signal, and transmits the command data signal to a tag circuit unit via a tuning unit.

Thereafter, the tag circuit unit amplifies the command data signal tagged and received via the RF antenna, and transmits the amplified command data signal to the NFC main chip. The NFC main chip transmits an interrupt event signal to the base band chip of the mobile terminal through using the interrupt request terminal IRQ, and transmits the command data signal from the external RF terminal.

Here, the base band chip transmits a low signal to the NOT rest/power down terminal NRSTPD of the NFC main chip, switches off internal current connection, stops the drive of an oscillator, and blocks connection between the external RF reader and a receiver input terminal RX and the connection between the external RF reader and two transmitter terminals TX1 and TX2.

Thereafter, the base band chip changes the main operation mode of the mobile terminal in accordance with the communication zone grouping mode of the external RF reader in response to the command data signal of the external RF reader, received from the NFC main chip, displays the results of the terminal processing of the mobile terminal on the display of the mobile terminal in the form of information, and transmits the results to the NFC chip module.

Further, if the results are transmitted to the USIM card which supports the SWP based on a design structure, the USIM card, which supports the SWP, performs the corresponding function of the NFC main chip, displays processed information on the display of the mobile terminal, and then transmits processed results to the NFC chip module. Thereafter, the NFC chip module receives the results of terminal processing (communication zone grouping mode) of the base band chip which operates in compliance with the external command, and transmits the results of the terminal processing to the external RF reader via the RF antenna.

Procedure of Releasing from Communication Zone Grouping Mode

First, a command data signal, used to release from the communication zone grouping mode, is set up in the external RF reader. Thereafter, the mobile terminal, in which an NFC chip module is provided, according to an embodiment of the present invention is tagged with the external RF reader. Thereafter, the NFC chip module transmits the command data signal, received from the external RF reader via the RF antenna, to the base band chip. That is, the RF antenna of the NFC chip module performs a tagging function based on the contactless-type external RF reader, receives the command data signal, and transmits the command data signal to the tag circuit unit via the tuning unit.

Thereafter, the tag circuit unit amplifies the command data signal tagged and received via the RF antenna, and transmits the amplified command data signal to the NFC main chip. The NFC main chip transmits an interrupt event signal to the base band chip of the mobile terminal through the interrupt request terminal IRQ, and transmits the command data signal from the external RF terminal. Here, the base band chip transmits a low signal to the NOT rest/power down terminal NRSTPD of the NFC main chip, switches off the internal current connection, stops the drive of the oscillator, and blocks connection between the external RF reader and the receiver input terminal RX and the connection between the external RF reader and the two transmitter terminals TX1 and TX2.

Thereafter, the base band chip releases the communication zone grouping mode of the mobile terminal in response to the command data signal of the external RF reader, which was received from the NFC main chip, converts the communication zone grouping mode into the main operation mode of the mobile terminal, displays the results of the terminal processing of the mobile terminal, obtained through conversion, on the display of the mobile terminal in the form of information, and transmits the results to the NFC chip module.

Further, if the results are transmitted to the USIM card which supports the SWP based on a design structure, the USIM card, which supports the SWP, performs the corresponding function of the NFC main chip, displays processed information on the display of the mobile terminal, and then transmits processed results to the NFC chip module. Thereafter, the NFC chip module receives the results of the terminal processing (release of communication zone grouping mode) of the base band chip which operates in compliance with an external command, and transmits the results of the terminal processing to the external RF reader via the RF antenna.

The present invention is not limited to the above-described embodiments. The present invention can provide RF-related service, including various types of SWPs, in such a way that the NFC main chip transmits an RF-related command, which includes an SWP and is received through the RF reader, to the base band chip or a USIM card which supports the SWP, with the result that the base band chip or the USIM card which supports the SWP processes the RF-related command, so that the results of command processing are displayed on various types of devices, such as a mobile terminal and a note computer, and then the results of command processing are provided to the RF reader in the form of RF command which includes the SWP using the NFC main chip, thereby providing notification of the results of the command processing.

As described above, in the present invention, the NFC chip module transmits a command data signal from the external RF reader to the base band chip or the USIM card, thereby using not only an NFC function but also a USIM function in multiple manners. With regard to the control of the functions of a mobile terminal which comes into contact with an external RF terminal over a near field, the present invention can provide NFC service, such as setting/releasing the functions of the mobile terminal as/from silent ringtone/etiquette mode, camera function restriction mode, and communication zone grouping mode.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A mobile terminal comprising:
    a baseband chip configured to process commands and control a plurality of functions of the mobile terminal; and
    an NFC module comprising an NFC chip and RF antenna, the NFC chip being connected to the baseband chip and the RF antenna,
    wherein the NFC module is configured to operate in a plurality of modes comprising a reader mode and a tag (or card emulation) mode, wherein, in its reader mode, the NFC module is configured to read data from a counterpart NFC device, wherein, in its tag mode, the NFC module is configured to make data available for the counterpart NFC device to read,
    wherein upon tagging the counterpart NFC device programmed with a command, the NFC module is configured to read the command and compulsory release instructions from the counterpart NFC device and to cause the command to be forwarded to the baseband chip,
    wherein upon receipt of the command, the baseband chip is configured to enable or disable one or more of the plurality of functions of the mobile device based on the command,
    wherein the compulsory release instructions comprise information for a user of the mobile terminal to use in disabling the one or more functions, if enabled based on the command, or enabling the one or more functions, if disabled based on the command.

2. The mobile terminal of claim 1, further comprising a USIM card connected to the baseband chip and the NFC module, wherein the NFC module is configured to forward the command to the baseband chip via the USIM to enable at least one function of the USIM, wherein the at least one function of the USIM comprises causes the mobile terminal to be authenticated.

3. The mobile terminal of claim 1, further comprising a USIM card connected to the baseband chip and the NFC module, wherein the NFC module is configured to forward the command directly to the baseband chip.

4. The mobile terminal of claim 1, further comprising a USIM card connected to the baseband chip and the NFC module, wherein the NFC module is configured to forward the command to the USIM card, and the USIM card is configured to forward the command to the baseband chip.

5. The mobile terminal of claim 4, wherein the USIM card is configured to forward the command from the counterpart NFC device to the baseband chip after authenticating the mobile terminal.

6. The mobile terminal of claim 4, wherein the USIM card is configured to forward the command from the counterpart NFC device to the baseband chip only when the mobile terminal is authenticated.

7. The mobile terminal of claim 6, wherein the data from the counterpart NFC device is configured to be routed to the USIM card according to a Single Wired Protocol (SWP).

8. The mobile terminal of claim 6, wherein the USIM card comprises a memory that stores an electronic serial number (ESN) of the mobile terminal for use in authentication of the electronic mobile device.

9. The mobile terminal of claim 8, wherein the mobile terminal is configured to use the ESN stored in the memory of the USIM card for authentication even if another ESN of the mobile terminal is stored within the mobile terminal.

10. (Previously Presented) The mobile terminal of claim 8, wherein baseband chip contains another ESN of the mobile terminal, wherein for authentication only the ESN stored in the memory of the USIM is used for authentication.

11. The mobile terminal of claim 1, wherein the RF antenna, which further comprises a read antennae and a tag antennae that are stacked together, wherein, in its reader mode, the read antennae is activated while the tag antennae is not.

12. The mobile terminal of claim 1, wherein the counterpart NFC device is configured to perform a tag mode and a reader/writer mode,
    wherein, in its reader/writer mode, the counterpart NFC device is configured to read data from or write data in the NFC module,
    wherein, in its tag mode, the counterpart NFC device is configure to provide data for the NFC module to read,
    wherein the counterpart NFC device is further configured to send an RF command for authenticating the mobile terminal.

13. The mobile terminal of claim 1, wherein the command is to activate or deactivate at least one of a silent-ringtone, a manner mode, a camera-function restriction mode, and a communication zone grouping mode.

14. The mobile terminal of claim 1, wherein the data from the counterpart NFC device further comprises a release time of the one or more functions that are enabled or disabled based on the command.

15. The mobile terminal of claim 14, wherein the compulsory release instructions are for a user of the mobile terminal to use in disabling the one or more functions, if enabled based on the command, or in enabling the one or more functions, if disabled based on the command, prior to the release time.

16. A system comprising:
    the mobile terminal of claim 2; and
    the counterpart NFC device installed at an entrance or exit of a facility, wherein the counterpart NFC device is configured for setting the mode-control command, for sending the data comprising the mode-control command, and for sending an RF command for authenticating the mobile terminal.

17. The system of claim 16, wherein the counterpart NFC device is configured to perform a tag mode and a reader/writer mode,
    Wherein, in its reader/writer mode, the counterpart NFC device is configured to read data from or write data in the NFC module,
    wherein, in its tag mode, the counterpart NFC device is configured to make data available for the NFC module of the mobile terminal to read.

18. The system of claim 16, wherein the USIM card is configured to forward the data from the counterpart NFC device to the baseband chip only when the mobile terminal is authenticated.

19. A method of controlling operation of a mobile terminal, the method comprising:
    providing the mobile terminal of claim 1;
    establishing, at the NFC module, an NFC channel with a counterpart NFC device when the mobile terminal tags the counterpart NFC device;
    receiving, at the NFC module, a command from the counterpart NFC device; and
    forwarding the command to the baseband chip such that the baseband chip enables or disables one or more of the plurality of functions of the mobile device based on the command.

20. The method of claim 19, wherein the mode-control command is to activate or deactivate at least one of a silent-ringtone, a manner mode, a camera-function restriction mode, and a communication zone grouping mode.

* * * * *

UNITED STATES PATENT AND TRADEMARK OFFICE
CERTIFICATE OF CORRECTION

| | | |
|---|---|---|
| PATENT NO. | : 9,172,786 B2 | Page 1 of 1 |
| APPLICATION NO. | : 14/589754 | |
| DATED | : October 27, 2015 | |
| INVENTOR(S) | : Sang Hoon Lee | |

It is certified that error appears in the above-identified patent and that said Letters Patent is hereby corrected as shown below:

In the Drawings,

Sheet 2 of 8 (FIG. 2) at line 41 (approx.), Change "SIGIN" to --SIGNIN--.

Sheet 2 of 8 (FIG. 2) at line 42 (approx.), Change "SIGOUT" to --SIGNOUT--.

In the Specification,

At Column 8, Line 39, Change "SIGIN" to --SIGNIN--.

Signed and Sealed this
Sixteenth Day of August, 2016

Michelle K. Lee
*Director of the United States Patent and Trademark Office*